Oct. 9, 1962 D. J. DOMIZI ETAL 3,058,004

MATERIAL INSPECTING DEVICE

Filed Feb. 12, 1960 3 Sheets-Sheet 1

*INVENTORS.*
DANTE J. DOMIZI
EDWARD HOLASEK
THEODORE H. SMITH
PATRICK E. LANNAN
BY [signature]
ATTORNEY INVENTORS.
DANTE J. DOMIZI
EDWARD HOLASEK
THEODORE H. SMITH
PATRICK E. LANNAN
BY
ATTORNEY

MATERIAL INSPECTING DEVICE

Filed Feb. 12, 1960 3 Sheets-Sheet 3

INVENTORS.
DANTE J. DOMIZI
EDWARD HOLASEK
THEODORE H. SMITH
PATRICK E. LANNAN
BY Justin W. Macklin
ATTORNEY United States Patent Office 3,058,004

Patented Oct. 9, 1962

3,058,004

MATERIAL INSPECTING DEVICE

Dante J. Domizi, Parma, Edward Holasek, Cleveland, Theodore H. Smith, Bay Village, and Patrick E. Lannan, Parma Heights, Ohio, assignors to Hammermill Paper Company, Erie, Pa., a corporation of Pennsylvania Filed Feb. 12, 1960, Ser. No. 8,415
9 Claims. (Cl. 250—219)

This invention relates to a device for inspecting material as it is moved across a predetermined line where the inspection is to take place. While the invention is applicable to a wide variety of materials, it is particularly useful in the inspection of material in the form of a moving web, such as a roll of paper, a strip of steel, or a strip of cloth. Also the device of the invention may be used to operate apparatus in accordance with a predetermined characteristic of the material being inspected. For example, the device of the invention may be used to operate a counter which provides a visible indication of the quality of the material being inspected. Alternatively, the device of the invention may be used to sort material having one quality from other material having a different quality or a plurality of different qualities.

Sorting devices of many different kinds have previously been proposed and used. Some of these have depended for their operation upon the light reflecting or light absorbing qualities of the material being inspected. However, there are many difficulties which are encountered when a plurality of such devices are to be used to inspect material at different parts in an inspection line as the material to be inspected is moved across the line of inspection. For example, prior art inspection devices of the general type under consideration here have commonly used photosensitive elements to sense the changes in the material being inspected. It is always, of course, desirable, and in many cases absolutely essential, in an inspection device of the type under consideration here that indications sensed in one part of the inspection line should correspond to those sensed in another part of the inspection line. In a system using photosensitive elements, this is, of course, not possible if the light available for inspection purposes along the inspection line varies from point to point along the inspection line.

Various attempts have been made to provide a light source suitable for a line-inspection device of the general type under consideration. It is at once apparent that, by a careful initial adjustment and by proper automatic control means for compensating for variations in the output of the light source or variations in ambient light, a relatively uniform light can be obtained across an inspection line of the type under consideration here. However, arrangements of this kind are very expensive and in many cases are impossible to use because of limitations in the space available. Also, arrangements of this type are relatively expensive, and this prevents their use in some cases. Many other solutions to the problem have been attempted, but none have proved satisfactory.

It is an object of the present invention to provide an improved device for inspecting material to be inspected as the material moves across a predetermined inspection line.

It is another object of the invention to provide an improved device for optically inspecting material at a plurality of different points in an inspection line.

It is another object of the invention to provide a device for optically inspecting material at a plurality of different points in an inspection line as the material to be inspected is moved across the inspection line and which provides uniform inspection results across the inspection line.

In accordance with the invention, a material inspecting device comprises a series of photoelectric devices, each of which is effective to inspect a portion of a predetermined line, as well as means for moving material to be inspected for predetermined variations across the line at a speed which is effective to provide, for such predetermined variations in the material, signal variations in the photoelectric devices within a predetermined frequency range. A light source is provided for the material inspecting device which comprises an elongated fluorescent tube supplied from an alternating current source having a second harmonic frequency which is outside of the above-mentioned signal frequency range for supplying light uniformly along the line for translation by the material to be inspected to the photoelectric devices. Electrical signal translating means are provided having a band width sufficient to transmit signals within the predetermined range mentioned above but effective to attenuate signals of the frequency of the unwanted signals produced by the alternating current supplying the light source. A means is provided for deriving and utilizing a control effect from the signal translating means. In one embodiment of the invention, this last named means is a device for counting imperfections in the material to be inspected.

For a better understanding of the present invention, together with other and further objects thereof, reference is had to the following description taken in connection with the accompanying drawings, and its scope will be pointed out in the appended claims.

In the drawings:

FIG. 1 shows in a diagrammatic form the inspection device of the invention;

FIGS. 2, 3, 4, and 5 show details of the scanning head of the FIG. 1 embodiment of the invention;

Figure 1:
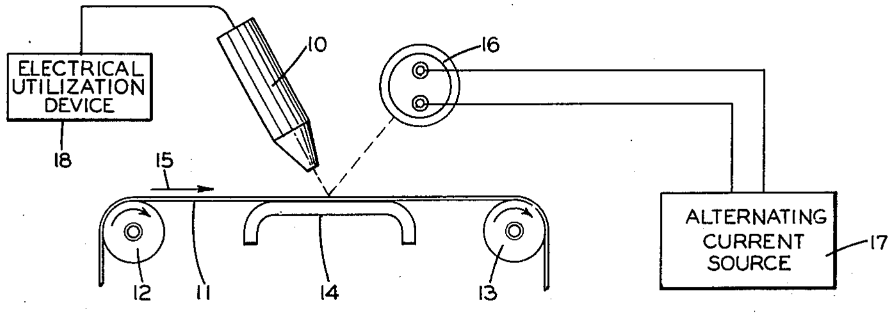

In the drawings, FIG. 1 represents a material inspecting device having a series of photoelectric devices each of which is effective to inspect a portion of a predetermined line. The series of photoelectric devices is indicated in FIG. 1 by the reference numeral 10. It will be understood that only an end view is represented in FIG. 1. A complete description of the series of photosensitive devices will be given hereinafter in connection with the description of FIGS. 2 to 5, inclusive. For the present it will be sufficient to consider the photoelectric device as comprising a series of single elements extending in a direction perpendicular to the paper.

The arrangement of FIG. 1 includes a means for moving material to be inspected for predetermned variations across an inspection line, represented by the series of photoelectric devices 10, at a speed which is effective to provide, for the predetermined variations in the material to be inspected, signal variations in the photoelectric device 10 within a predetermined frequency range. Thus in FIG. 1 the material to be inspected is represented by the reference numeral 11. This material may comprise a web of material adapted to be driven over rollers 12 and 13 in the direction indicated by arrow 15 past the line of photosensitive devices 10.

While the device of the invention may be used for inspecting a wide variety of material, it is of particular utility in inspecting a web of material such as steel, paper or cloth. As a preferred embodiment of the invention, the device will be described as an inspection device for a roll of paper. It will also be understood that the direction of movement of the material 11 is not critical and that the direction of movement indicated by the arrow 15 has been chosen purely for the purposes of illustration. A back-up plate 14 is preferably provided for web 11 to insure that the inspection effected by the photosensitive devices 10 is always made at the same distance from the photoelectric elements.

It will be understood that, if desired, the backing plate 14 for the paper 11 can be placed on top of the paper 11 and that, in such a case, the photoelectric devices 11 can be arranged to inspect the paper adjacent to, or through a slot in, the backing plate.

A light source 16 is provided for the FIG. 1 arrangement, which comprises a fluorescent tube extending in a direction normal to the plane of the paper. The light source 16 is provided to supply light uniformly along the line to be inspected by the photosensitive device 10. An ordinary flourescent light, operated at conventional power frequencies, would provide an output from the photosensitive elements 10 at twice the frequency of the power supply source. This would have the effect of providing an unwanted signal output from the photosensitive device 10 for most inspection operations. The use of a direct current power source for such a light source is not practical for many purposes, because it has been found that the continual conduction of current in the same direction causes dark bands to appear in the light source along its length. Specifically, it is found that in time one end of the flourescent tube becomes appreciably darker than the other end of the tube. Inasmuch as the purpose of the present device is to provide an inspection of the material of web 11 across its width at a plurality of points along an inspection line with a high degree of uniformity, it will readily be seen that variations in intensity of the light source 16 along its length would be fatal to the intended purpose. Light source 16, therefore, is supplied with an alternating current from source 17 for the purpose of eliminating the undesirable variations in light intensity of light source 16 along its length, and the frequency of this alternating current is such that the resulting variations in the output of photosensitive device 10 are above the range of signals obtained due to variations in the material 11 being inspected.

Because of the fact that the frequency of the unwanted signals produced by the action of light source 16 in the photosensitive devices 10 is twice the frequency of the light source, the second harmonic frequency of light source 16 is preferably selected to be above the range of signals obtained due to variations in the material being inspected. Actually, because unwanted signals of the frequency of the fundamental of the light source may also appear, it is also preferable in some cases if the fundamental frequency of the light source is above the range of signals obtained due to variations in the material being inspected.

The device of FIG. 1 comprises an electrical utilization device 18 for utilizing the output signal from the series of photoelectric devices 10. The electrical signal translating means in unit 18 has a band width sufficient to translate signals within the desired signal range from photosensitive elements 10 but such as to attenuate signals of the frequency of alternating source 17. The details of the electrical utilization device 18 will be described in more detail hereinafter in connection with the description of FIGS. 6 and 7.

In FIGS. 2 to 5, inclusive, are shown additional details of the FIG. 1 embodiment of the invention, and elements which are identical to those of FIG. 1 bear identical reference numerals.

Figure 2:
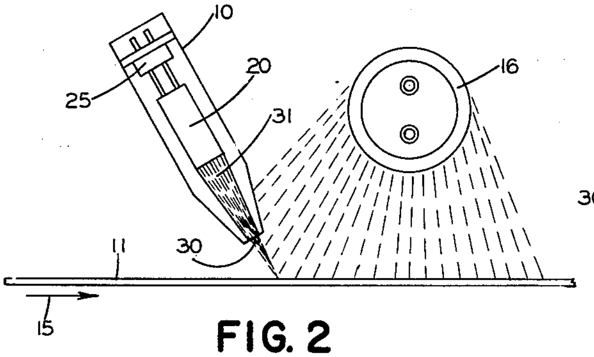
Figure 4:
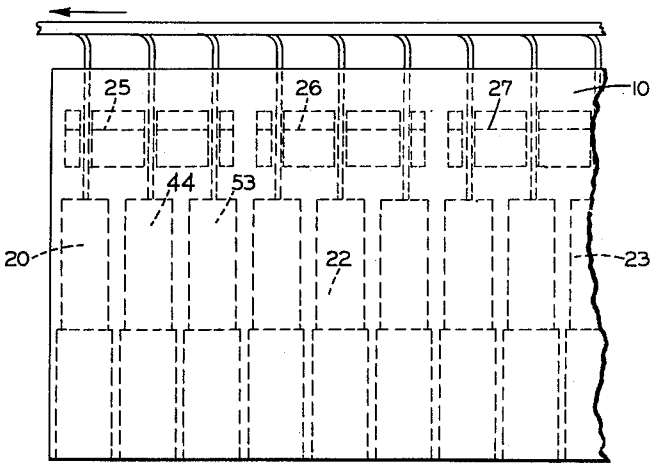

Thus in FIG. 2 the end of the light source 16 is indicated as supplying light, some of which is reflected by the web 11 to the photoconductor 20 which is an element in the series of photoelectric devices 10. The housing of the photoelectric devices 10 encloses the series of photoconductors of which photoconductor 20 is one. Other photoconductors of the series are shown in FIG. 4, and two of such are designated by the reference numeral 22 and 23.

Each of the photoconductors is connected to a plug-in connector. In the embodiment illustrated, three such photosensitive devices plug into one connector. Thus, the plug-in connector in FIG. 4 is indicated by the reference numeral 25. It will be seen from FIG. 2 that the photoconductor 20 is connected to the connector 25. This is also illustrated in FIG. 4. Also, it will be seen from FIG. 4 that the photoconductor 22 is connected to a plug-in connector 26 and that the photoconductor 23 is connected to a connector 27. In fact, photoconductor 20, as illustrated in FIG. 4, is connected to the first portion of connector 25; photoconductor 22 is connected to the middle portion of connector 26; while photoconductor 23 is connected to the third or last portion of connector 27. It will be seen that additional photoconductors not bearing reference numerals are illustrated in FIG. 4 and that these are connected to other portions of plug-in connectors 25, 26, and 27.

Again referring to FIG. 2, it will be seen that light from fluorescent lamp 16 enters a slot 30 and travels through a tapered aperture 31 to impinge upon photoconductor 20.

Figure 3:
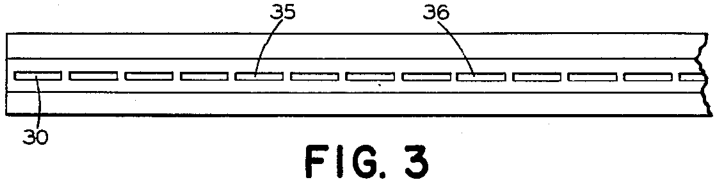

The slot 30 is only one of a series of slots along the series of photoelectric devices. Thus, a portion of the series of slots is illustrated in FIG. 3. It will be seen that slot 30 is at the end of the series of slots and is the slot through which light is supplied to photoconductor 20 (FIG. 2 and FIG. 4). The slot which supplies light to photoconductor 22 (FIG. 4) is designated by the reference numeral 35 in FIG. 3. Similarly, the slot which supplies light to photoconductor 23 is designated by the reference numeral 36 in FIG. 2.

Figure 5:
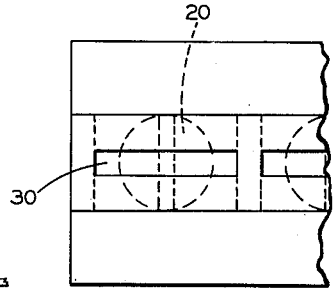

In FIG. 5 is illustrated an enlarged view of the end of photoconductor 20 and its cooperating slot 30. In the preferred embodiment of the invention, the slots of the series of photoelectric devices, represented by the slot 30, are positioned to be about three-sixteenths of an inch from the material to be inspected as it moves past the inspection line.

Figure 6:
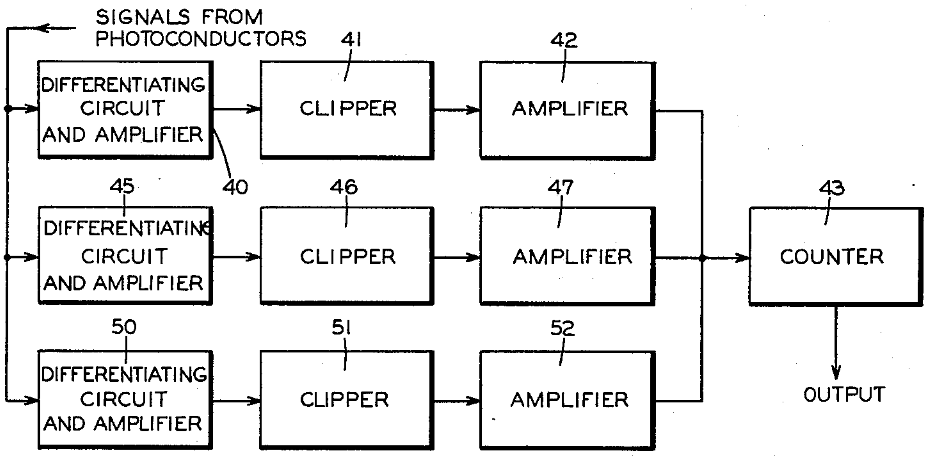
FIG. 6 shows in block form portions of the electrical utilization device of FIG. 1.

The block diagram of FIG. 6 illustrates the manner in which the FIG. 1 embodiment of the invention is utilized to count the defects of a predetermined size in a sheet of material such as paper. Thus, the photosensitive device 20 is coupled to an electrical circuit which includes a differentiating circuit and amplifier 40, a clipper 41 and an amplifier 42 from which a signal is fed to a counter 43. The counter 43 is utilized to count the detection of a flaw in the paper in a manner which will be described in more detail hereinafter.

The second photosensitive device 44 in the series of sensing devices illustrated in FIG. 4 is connected to another set of the circuit elements of FIG. 6. Thus the sensing device 44 is connected to a differentiating circuit and amplifier 45. This unit, in turn, is connected to a clipper 45 and an amplifier 47 which also is connected to the counter 43.

The third photosensitive device 53 (FIG. 4) is similarly connected to a series of units 50, 51, and 52 (FIG. 6) which, in turn, also supply a signal input to the counter 43.

Each other set of three photosensitive devices of FIG. 4 is also coupled into a circuit similar to that of FIG. 6. This has the advantage that the electronic units of FIG. 6 can be constructed in modules, each of which is effective to serve a set of three sensing units.

Figure 7:
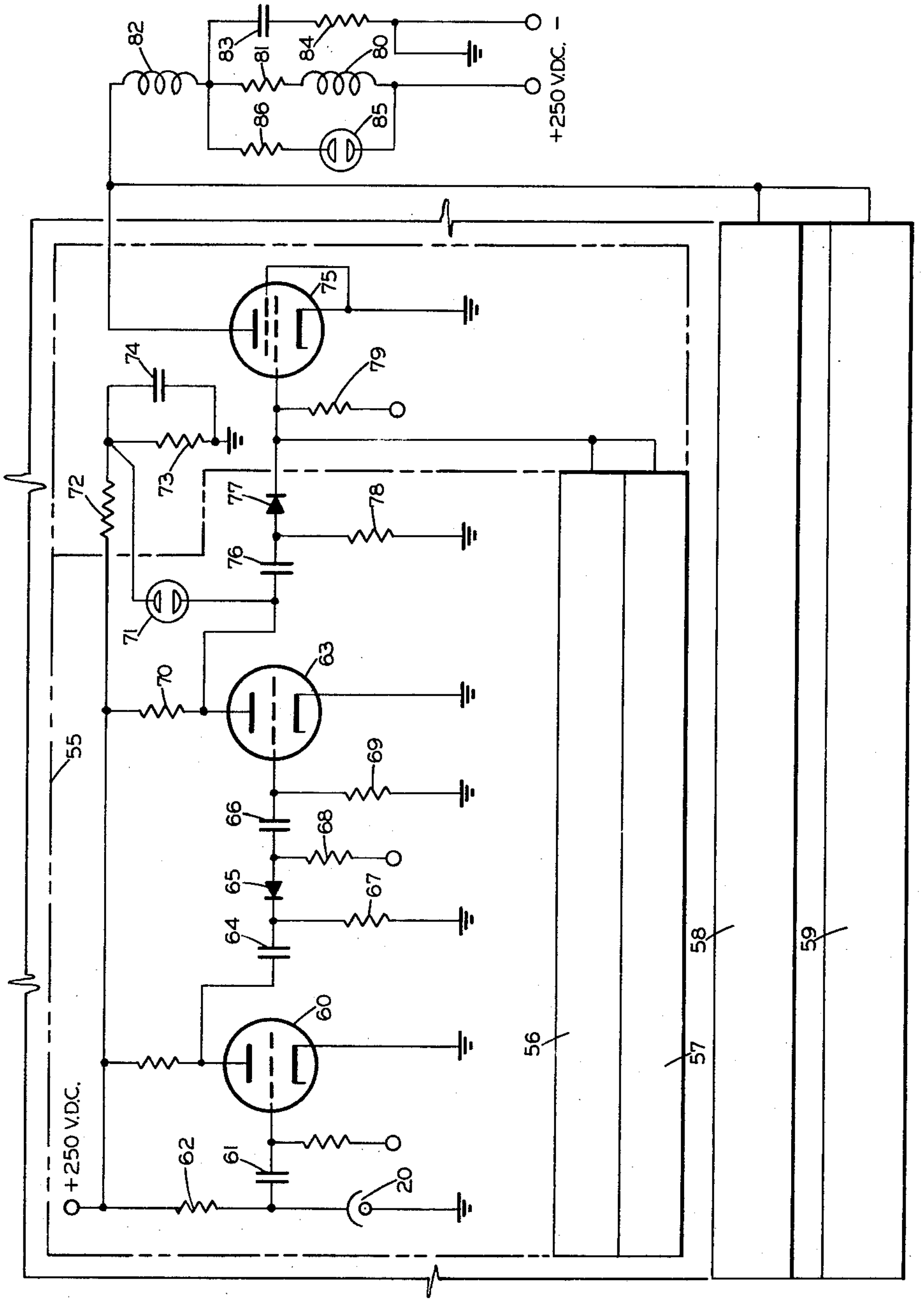
FIG. 7 shows the wiring diagram of a portion of the FIG. 6 block diagram.

Reference is made to FIG. 7 for a more detailed description of the modules just mentioned. Thus in FIG. 7, there is shown within the broken line 55 the module #1 which serves the photosensitive device 20.

It will be understood that a similar circuit is included within the block 56 and that such circuit serves the sensing device 44 (FIG. 4). A similar circuit, included within a box 57, is utilized to amplify and select proper portions of the signal output of photosensitive device 53 (FIG. 4).

It will be understood that module #2, indicated by the reference numeral 58, is similar to module #1 and that the photosensitive elements of FIG. 4, which are connected to plug-in connector 26, are coupled to the circuits of module #2 in a manner identical to that described above.

Module #3 again is similar to module #1 and #2, and the photosensitive elements of FIG. 4, which are coupled to plug-in connector 27, are thus also connected through this connector to the circuits of module #3.

It will be understood that each set of three photosensing elements which are provided in the inspecting device are coupled to a separate module. There is thus provided a separate module for each set of three photosensing devices in the preferred embodiment of the invention.

Referring now to the circuit diagram of FIG. 7, to which photosensitive device 20 is coupled, there is provided an amplifier 60 to the grid of which the photosensitive device 20 is coupled through a condenser 61. One side of the photosensitive device 20 is grounded and the other side is connected through a resistor 62 to a source of D.C. operating potential, indicated in the drawing as +250 VDC. The cathode of tube 60 is grounded and its anode is connected to the source of operating voltage through a suitable load resistor. The anode of tube 60 is coupled to the grid of a second vacuum tube 63 through a series-connected condenser 64, a diode 65, and a condenser 66. The common junction of condenser 64 and diode 65 is grounded through a resistor 67. The common junction of diode 65 and condenser 66 is connected to a source of bias voltage (not shown) through a resistor 68. The cathode of tube 63 is grounded, and its grid is connected to ground through a resistor 69. The anode of tube 63 is connected to the source of operating potential through a resistor 70.

A neon tube 71 is connected between the anode of tube 63 and the junction of a voltage divider which comprises resistors 72 and 73 connected in series between the direct current operating source and ground. Resistor 73 is shunted by a condenser 74.

The output from tube 63 is used to trigger a thyratron tube 75. The anode of tube 63 is connected to the grid of the tube 75 through the series-connected condenser 76 and diode 77. The common junction of these components is grounded through a resistor 78. A bias potential is provided for the grid of tube 75 through a resistor 79 from a suitable source of bias voltage (not shown).

The thyratron tube 75 is utilized to operate a counter of any suitable type. The operating coil of the counter is indicated by the numeral 80 in the drawing. The coil 80 is connected in series with a resistor 81 and a choke coil 82 between the source of operating potential and the anode of tube 75. A condenser 83 and a resistor 84 are connected in series between tht junction of coil 82 and resistor 81 and ground. A neon tube 85 is connected in series with resistor 86 between this junction and the source of operating voltage.

Reference is now made to the drawings for a description of the operation of the inspecting device which has just been described. The material 11 shown in FIG. 1 may, for example, be a roll of paper for which it is desired to have the flaws or defects of a predetermined magnitude counted. Specific attention will be given to the function of one of the photosensitive elements, for example element 20, in finding a flaw and operating the counter. As will be seen, the element 20 is provided with a baffle enclosure acting as a light shield to eliminate extraneous light from entering the system. A small slot 30 is provided in the enclosure, through which the photosensitive element 20 can receive light from the material 11 to be inspected. The fluorescent lamp 16 illuminates the material with diffused light, which reflects from the surface into the slot 30. This light is confined within the limits of the aperture walls and impinges upon the photosensitive surface of element 20. Light therefore reaches the photosensitive area of element 20 by a direct reflected path and by light from the surface reflecting back and forth between the walls of the aperture. The amount of light that enters a slot of fixed dimensions is a function of the spacing of the aperture from the inspected material 11 and the angle it assumes with respect to the plane of that material, when illuminated at a given level. This angle is preferably adjusted to minimize the background noise due to surface roughness of the material 11.

The photosensitive element 20 functions as a variable impedance, changing inversely as the total light level reaches its surface. An amplitude modulated signal is obtained in accordance with the variations in average light level produced by adjacent areas of the inspected material as it is moved through the field of view. Extreme deviations in light level provide usable signals for operating the counter. Either a greater or lesser amount of light from one moment to the next will be interpreted as a flaw. Since both the principles of reflection and diffusion are utilized, any irregularity in the material surface commensurate with the resolution obtainable may be detected. The resolution of one system which has been used for detecting flaws in paper is such that a blemish approximately equal (in light reflection) to a gray dot one-sixteenth inch in diameter, as seen against a white background, is readily detectable at paper speeds up to 1200 feet per minute. The slot which was used was 5/16 of an inch long by 3/64 of an inch wide. The material width in this installation was twenty-nine inches and ninety photosensitive devices corresponding to device 20 were used. In this installation the lamp 16 was a thirty watt, thirty-six inch fluorescent lamp.

From FIG. 6 it will be seen that the signal output from photosensitive device 20 can be utilized to operate counter 43 after translation by the circuits of units 40, 41 and 42. It will also be seen that the output signal from photosensitive element 44 (FIG. 4) is utilized after translation by units 45, 46, and 47 (FIGS. 6) to operate the same counter 43. Similarly, photosensitive element 53 can operate the same counter 43 through units 50, 51, and 52. Energization of the coil 80 (FIG. 7) of the counter 43 was in the installation mentioned above, used to operate a mechanical counter. However, it is obvious that the energization of the solonoid 80 could be used to effect any desired control operation, such as sorting sheets; stopping the travel of the material being inspected; marking the defect on the material being inspected, etc. It will also be obvious that the system could be used to inspect material or components laying upon and being moved by the web 11.

The photocells which were used in the installation illustrated (Clarex-Cl-7) were of such a nature that in complete darkness each cell represents a resistance of several megohms. However, the amount of light normally entering the slot while the flourescent lamp 16 was on and a clean piece of paper was in position was such as to decrease the cell impedance to approximately 170,000 ohms. This allowed 500 microamperes to flow through the photocell, resulting in a voltage of 85 v. at the junction of photocell 20 and resistor 62 (see FIG. 7).

Under these conditions, it will be assumed that a dark spot on the paper 11 passes the scanning head 20. This causes the resistance of the cell 20 to rise momentarily. The condenser 61 (FIG. 7) performs three functions:

(1) Isolation of the grid of tube 60 so that the tube can be properly biased through the resistor coupled to its grid.

(2) Differentiation of the signal output may be provided by cell 20 so that if the flaw should be of such a nature that it results in a negative pulse to condenser 61, the grid of tube 60 will first have a positive pulse applied to it and thereafter will receive a negative pulse.

(3) Isolation of the D.C. operating voltage from the grid of tube 60 so that the bias for tube 60 does not need to be readjusted for varying types of paper.

The tube 60 is biased almost to cutoff. Under these conditions a negative pulse applied to its grid will have little or no effect, but a positive pulse will cause the tube to conduct. Thus, the application of a positive pulse to the grid of tube 60 results in a negative pulse being applied to diode 65 through the condenser 64. The diode is so connected that this pulse is passed through condenser 66 to the grid of tube 63.

A source of clipping bias potential is applied to diode 65 through the resistor 68. This bias voltage is adjusted so that negative pulses which are less than some predetermined amplitude will not pass through condenser 66 to the grid of tube 63. A negative pulse applied to the grid of tube 63 drives this tube to cutoff, which has the effect of applying a positive pulse to the neon tube 71. This causes the neon tube to fire and thus provide a visual indication that a flaw has been detected. The positive pulse provided by tube 63 is also effective to trigger the thyratron tube 75. The diode 77, as well as similar diodes in modules #2 and #3, are provided to prevent an interaction between modules #1, #2, and #3, since all three are connected to the grid of thyratron 75. Thus, when a positive pulse is received from any one of the modules #1, #2, or #3, which is sufficient to overcome the bias at the grid of tube 75, this tube will be triggered into its conductive state. When tube 75 is triggered, the condenser 83 is discharged. The neon tube 85 gives a visual indication at this time. The condenser 83 then charges through resistor 81 and the coil 80 causing the counter to operate to indicate an imperfection which has been sensed by one of the photosensitive elements 20, 44, and 53 (FIG. 4).

The light source 16 provides a very constant illumination along the line where the photosensing elements are located. Such light sources are customarily operated on a sixty cycle source of alternating current. However, it was found that with such an excitation the sixty cycle was picked up directly by the photosensitive elements such as element 20. On the other hand, the use of direct current as a source for the lamp 16 was found to be extremely troublesome and comparatively impractical. The reason for this was that the illumination was not uniform along the line of the sensing heads. Furthermore, with continued use, portions of the fluorescent tube along its length tended to become darkened, thus adding to the difficulties.

Applicants solved the problem by providing a source of high frequency for the excitation of the fluorescent tube, by providing a suitable pass band for the circuit of FIG. 7, and by arranging the circuit so that signals of the second harmonic frequency of the exciting source for lamp 16 are not passed by the system.

Figure 8:
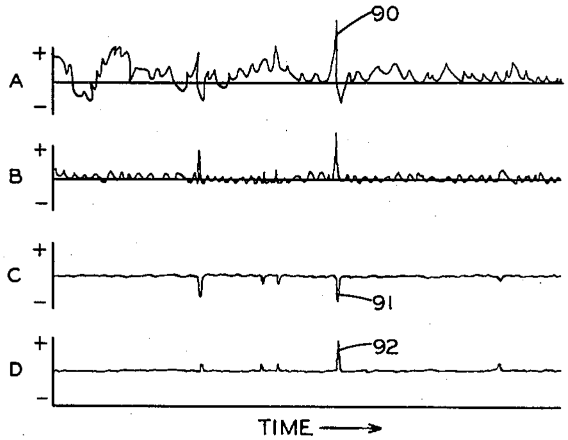
FIG. 8 is used in explaining the operation of the circuit of FIG. 7.

Reference is made to FIG. 8 for a more detailed description of the operation of the circuit of FIG. 7. Thus, curve A represents a typical output signal for one of the photosensing heads during a time interval when a defect, as described above, which is 1/16 of an inch in diameter, is scanned by the sensing head. The output of the photosensing element is normally subject to ambient variations as illustrated, but, when the defect is scanned, a large positive signal, as indicated by the reference numeral 90 of FIG. 8, is present. The signal input to tube 60, under the conditions assumed, is indicated in Curve B, and the signal at the output of the clipper 65 or the input signal to tube 63 is indicated by Curve C. It will be seen that substantially the only effective portion of the original signal which is retained at this part of the circuit is represented by the negative pulse 91. Pulse 91 of course was derived from the pulse 90 of Curve A which was the response due to a detected fault. The negative pulse 91 of Curve C is further amplified in tube 63 and a change of polarity results, thus providing the positive pulse 92 of Curve D. This positive pulse is applied to the thyratron 75 which is so biased as to be operated only by the peak of a signal of a substantial amplitude. Thus, the thyratron 75 is unresponsive to any of the signal variations of FIG. 8 except those resulting from the detected flaw.

It will thus be seen that the high frequency source 17 provides an excitation for flourescent tube 16 which gives a very uniform distribution of light along the photosensitive heads, but that the electrical circuit of FIG. 7 is not responsive to the frequency of this source.

While applicants do not intend to be limited to circuit elements of any particular type or value, there follows a list of the values of the circuit elements which were used in the above-mentioned device for detecting flaws in paper:

| | |
|---|---|
| Condensers 61 and 66 | 0.005 m.f.d. |
| Condensers 64 and 76 | 0.01 m.f.d. |
| Condenser 74 | 0.25 m.f.d.—200 v. |
| Condenser 83 | 4.0 m.f.d.—450 v. |
| Resistor 62 | 330K—½ w.—10%. |
| Resistors 70 and 86 | 47K—½ w.—10%. |
| Resistor 67 | 680K—½ w.—10%. |
| Resistors 68 and 79 | 100K—½ w.—10%. |
| Resistors 69 and 78 | 1.0M—½ w.—10%. |
| Resistors 72 and 73 | 120K—½ w.—10%. |
| Resistor 81 | 2.5K—5 w.—10%. |
| Resistor 84 | 10K—1 w.—10%. |
| Tube 65 | Type 1N58A. |
| Tube 77 | Type 1N55A. |
| Tubes 60 and 63 | Type 12AX7. |
| Tube 75 | Type 2D21. |

While there has been described what is at present considered to be the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What we claim is:

1. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube supplied from an alternating current source having a second harmonic frequency which is outside of said signal frequency range for supplying light uniformly along said line for translation by said material to said photoelectric devices; electrical signal translating means responsive to a signal generated in said devices and having a band width sufficient to translate signals within said predetermined range but effective to attenuate signals of the second harmonic frequency of said light source; and means for deriving and utilizing a control effect from said signal translating means.

2. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube supplied from an alternating current source having a second harmonic frequency which is above said signal frequency range for supplying light uniformly along said line for translation by said material to said photoelectric devices; electrical signal translating means responsive to a signal generated in said devices and having a band width sufficient to translate signals within said predetermined range but effective to attenuate signals of the second harmonic frequency of said light source; and means for deriving and utilizing a control effect from said signal translating means.

3. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube adjacent to and parallel with said predetermined line and supplied from an alternating current source having a second harmonic frequency which is outside of said signal frequency range for supplying light uniformly along said line for the translation by said material to said photoelectric devices; electrical signal translating means responsive to a signal generated in said devices and having a band width sufficient to translate signals within said predetermined range but effective to attenuate signals of the second harmonic frequency of said light source; and means for deriving and utilizing a control effect from said signal translating means.

4. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated flourescent tube supplied from an alternating current source having a second harmonic frequency which is outside of said signal frequency range for supplying light uniformly along said line for translation by said material to said photoelectric devices; electrical signal translating means responsive to a signal generated in said devices and having a band width sufficient to translate signals within said predetermined range but effective to attenuate signals of the second harmonic frequency of said light source; a trigger device; and means for utilizing signals translated by said signal translating means to trigger said trigger device to provide a control effect dependent upon detection of said predetermined variation.

5. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated flourescent tube supplied from an alternating current source having second harmonic frequency which is outside of said signal frequency range for supplying light uniformly along said line for translation by said material to said photoelectric devices; a separate electrical signal translating means for each of said photoelectric devices and having a band width sufficient to translate signals within said predetermined range but effective to attenuate signals of the second harmonic frequency of said light source; and means for deriving and utilizing a control effect from each of said signal translating means.

6. A material inspecting device comprising: a series of photoelectric devices, each of which is effective to inspect a portion of a predetermined line; means for moving material to be inspected for predetermined variations across said line at a speed which is effective to provide, for said predetermined variations, signal variations in said photoelectric devices within a predetermined frequency range; a light source comprising an elongated fluorescent tube supplied from an alternating current source having a second harmonic frequency which is outside of said signal frequency range for supplying light uniformly along said line for translation by said material to said photoelectric devices; a separate electrical signal translating means for each of said photoelectric devices and having a band width sufficient to translate signals within said predetermined range but effective to attenuate signals for the second harmonic frequency of said light source; a trigger device; means for utilizing an output signal from only a few of said separate electrical signal translating means to trigger said trigger device; and means for deriving a control effect from the output of said trigger device.

7. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube supplied from an alternating current source having a second harmonic frequency which is outside of said signal frequency range for supplying light uniformly along said line for translation by said material to said photoelectric devices; electrical signal translating means responsive to a signal generated in said devices and having a band width sufficient to translate signals within said predetermined range but effective to attenuate signals of the second harmonic frequency of said light source; a thyratron trigger device, means for utilizing only the peak of a signal passed by said signal translating means to trigger said trigger device, and means responsive to said trigger device for deriving and utilizing a control effect dependent upon the detection of one of said predetermined variations.

8. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube supplied from an alternating current source having a frequency which is outside of said signal frequency range for supplying light uniformly along said line for translation by said material to said photoelectric devices; electrical signal translating means responsive to a signal generated in said devices and having a band width sufficient to translate signals within said predetermined range but effective to attenuate signals of the frequency of said light source; and means for deriving and utilizing a control effect from said signal translating means.

9. A material inspecting device comprising: a series of photoelectric devices, each of which is effective to inspect a portion of a predetermined line; means for moving material to be inspected for predetermined variations across said line at a speed which is effective to provide, for said predetermined variations in said material, signal variations in said photoelectric devices within a predetermined frequency range; a light source comprising an elongated fluorescent tube supplied from an alternating current source having a frequency which is outside of said signal frequency range for supplying light uniformly along said line for translation by said material to said photoelectric devices; electrical signal translating means responsive to a signal generated in said devices and having a band width sufficient to translate signals within said predetermined range but effective to attenuate signals of the frequency of said light source; a thyratron trigger device, means for utilizing only the peak of a signal passed by said signal translating means to trigger said trigger device, and means responsive to said trigger device for deriving and utilizing a control effect dependent upon the detection of one of said predetermined variations.

References Cited in the file of this patent

UNITED STATES PATENTS

| | | |
|---|---|---|
| 2,749,533 | Daniels | June 5, 1956 |
| 2,758,712 | Linderman | Aug. 14, 1956 |
| 2,858,421 | Touvet | Oct. 28, 1958 |
| 2,878,395 | Mindheim | Mar. 17, 1959 |